(12) United States Patent
Hu et al.

(10) Patent No.: US 11,520,930 B2
(45) Date of Patent: Dec. 6, 2022

(54) PRIVACY PROTECTION FOR THIRD PARTY DATA SHARING

(71) Applicant: Alcatel Lucent, Boulogne Billancourt (FR)

(72) Inventors: Zhiyuan Hu, Shanghai (CN); Wen Wei, Shanghai (CN); Xueqiang Yan, Shanghai (CN); Zhigang Luo, Shanghai (CN)

(73) Assignee: Alcatel Lucent, Nozay (FR)

( * ) Notice: Subject to any disclaimer, the term of this patent is extended or adjusted under 35 U.S.C. 154(b) by 688 days.

(21) Appl. No.: 15/513,731

(22) PCT Filed: Sep. 26, 2014

(86) PCT No.: PCT/CN2014/087492
§ 371 (c)(1),
(2) Date: Mar. 23, 2017

(87) PCT Pub. No.: WO2016/045071
PCT Pub. Date: Mar. 31, 2016

(65) Prior Publication Data
US 2017/0249480 A1 Aug. 31, 2017

(51) Int. Cl.
*G06F 21/00* (2013.01)
*G06F 21/62* (2013.01)
*G06F 16/21* (2019.01)

(52) U.S. Cl.
CPC .......... *G06F 21/6263* (2013.01); *G06F 16/21* (2019.01); *G06F 21/6254* (2013.01)

(58) Field of Classification Search
None
See application file for complete search history.

(56) References Cited

U.S. PATENT DOCUMENTS 8,719,284 B2    5/2014 Schirmer et al.
2003/0163416 A1* 8/2003 Kitajima ............... G06Q 20/02
                                                    705/39

(Continued)

FOREIGN PATENT DOCUMENTS

CN    102340514 A    2/2012
CN    103067918 A    4/2013

(Continued)

OTHER PUBLICATIONS

International Search Report for PCT/CN2014/087492 dated May 27, 2015.

*Primary Examiner* — Jeffery L Williams
(74) *Attorney, Agent, or Firm* — Fay Sharpe LLP (57) ABSTRACT

A set of raw data relating to activity of one or more users in accordance with a communication network is obtained. The communication network is managed by a network operator. The obtained set of raw data is processed in accordance with at least one data isolation policy maintained by the network operator to generate a first set of data comprising at least a portion of the set of raw data with sensitive data associated with the one or more users removed; a second set of data comprising the sensitive data removed from the set of raw data; and a third set of data comprising a mapping between portions of the set of raw data and the first set of data. The first set of data is exposed to a third party, while the second set of data and the third set of data are isolated from the third party.

1 Claim, 7 Drawing Sheets

(56) References Cited

U.S. PATENT DOCUMENTS

| | | | |
|---|---|---|---|
| 2007/0263632 A1* | 11/2007 | Sobue | G06Q 10/087 370/395.2 |
| 2010/0005509 A1* | 1/2010 | Peckover | G06F 21/10 726/3 |
| 2011/0258206 A1* | 10/2011 | El Emam | G06F 21/577 707/754 |
| 2013/0204996 A1* | 8/2013 | Takazawa | H04L 41/08 709/223 |
| 2013/0268357 A1 | 10/2013 | Heath | |
| 2014/0309849 A1* | 10/2014 | Ricci | H04W 4/44 701/33.4 |
| 2015/0033356 A1* | 1/2015 | Takenouchi | H04L 63/0407 726/26 |
| 2015/0186518 A1* | 7/2015 | Kusumoto | G06Q 30/0631 709/203 |
| 2015/0356591 A1* | 12/2015 | Fano | G06N 99/00 705/14.27 |
| 2017/0213246 A1* | 7/2017 | Shahan | G06Q 30/0255 |
| 2017/0243028 A1* | 8/2017 | LaFever | G06F 21/6254 |

FOREIGN PATENT DOCUMENTS

| | | |
|---|---|---|
| CN | 103294967 | 9/2013 |
| CN | 103607393 | 2/2014 |
| CN | 103747090 | 4/2014 |
| CN | 104050267 A | 9/2014 |
| EP | 2 811 449 | 12/2014 |
| JP | 2002-170035 | 6/2002 |
| JP | 2003-197642 | 7/2003 |
| JP | 2005-346248 | 12/2005 |
| JP | 2007-264730 | 10/2007 |
| JP | 2013-161166 | 8/2013 |
| JP | 2015-130012 | 7/2015 |
| WO | WO 2013/122233 | 5/2015 |

\* cited by examiner

FIG. 1A

| USER_ID | USER_s_INFO | USER_p_INFO | SERVICE_ID | SERVICE_TYPE | SERVICE_INFO | ACCESS_TIME | ITEMS | BILL_INFO | .... |
|---|---|---|---|---|---|---|---|---|---|
| USER_1 | USER1_s_INFO | USER1_p_INFO | SERVICE_1 | BOOK STORE | SERVICE1_INFO | 13:00 JULY 1 2014 | HARRY POTTER | USD50 | |
| USER_1 | USER1_s_INFO | USER1_p_INFO | SERVICE_2 | CATERING SERVICE | SERVICE2_INFO | 08:00 JULY 3 2014 | CAPPUCCINO COFFEE | USD5 | |
| USER_1 | USER1_s_INFO | USER1_p_INFO | SERVICE_3 | CLOTHES STORE | SERVICE3_INFO | 17:00 JULY 7 2014 | A DRESS | USD200 | |
| USER_2 | USER2_s_INFO | USER2_p_INFO | SERVICE_1 | BOOK STORE | SERVICE1_INFO | 14:00 JULY 5 2014 | HARRY POTTER | USD49 | |
| USER_2 | USER2_s_INFO | USER2_p_INFO | SERVICE_3 | CLOTHES STORE | SERVICE3_INFO | 19:00 JULY 8 2014 | A JACKET | USD200 | |
| .... | | | | | | | | | |

| ANONYMOUS_ID | USER_p_INFO | SERVICE_ID | SERVICE_TYPE | SERVICE_INFO | ACCESS_TIME | ITEMS | BILL_INFO | .... |
|---|---|---|---|---|---|---|---|---|
| ANONYMOUS_1 | USER1_p_INFO | SERVICE_1 | BOOK STORE | SERVICE1_INFO | 13:00 JULY 1 2014 | HARRY POTTER | USD50 | |
| ANONYMOUS_1 | USER1_p_INFO | SERVICE_2 | CATERING SERVICE | SERVICE2_INFO | 08:00 JULY 3 2014 | CAPPUCCINO COFFEE | USD5 | |
| ANONYMOUS_1 | USER1_p_INFO | SERVICE_3 | CLOTHES STORE | SERVICE3_INFO | 17:00 JULY 7 2014 | A DRESS | USD200 | |
| ANONYMOUS_2 | USER2_p_INFO | SERVICE_1 | BOOK STORE | SERVICE1_INFO | 14:00 JULY 5 2014 | HARRY POTTER | USD49 | |
| ANONYMOUS_2 | USER2_p_INFO | SERVICE_3 | CLOTHES STORE | SERVICE3_INFO | 19:00 JULY 8 2014 | A JACKET | USD200 | |
| .... | | | | | | | | |

| USER_ID | ANONYMOUS_ID |
|---|---|
| USER_1 | ANONYMOUS_1 |
| USER_2 | ANONYMOUS_2 |
| ... | ... |

| USER_ID | USER_s_INFO |
|---|---|
| USER_1 | USER1_s_INFO |
| USER_2 | USER2_s_INFO |
| ... | ... |

| ANONYMOUS_ID | USER_p_INFO | SERVICE_ID | SERVICE_TYPE | SERVICE_INFO | ACCESS_TIME | ITEMS | BILL_INFO |
|---|---|---|---|---|---|---|---|
| ANONYMOUS_1 | USER1_p_INFO | SERVICE_1 | BOOK STORE | SERVICE1_INFO | 13:00 JULY 1 2014 | HARRY POTTER | USD50 |
| ANONYMOUS_2 | USER1_p_INFO | SERVICE_2 | CATERING SERVICE | SERVICE2_INFO | 08:00 JULY 3 2014 | CAPPUCCINO COFFEE | USD5 |
| ANONYMOUS_3 | USER1_p_INFO | SERVICE_3 | CLOTHES STORE | SERVICE3_INFO | 17:00 JULY 7 2014 | A DRESS | USD200 |
| ANONYMOUS_4 | USER2_p_INFO | SERVICE_1 | BOOK STORE | SERVICE1_INFO | 14:00 JULY 5 2014 | HARRY POTTER | USD49 |
| ANONYMOUS_5 | USER2_p_INFO | SERVICE_3 | CLOTHES STORE | SERVICE3_INFO | 19:00 JULY 8 2014 | A JACKET | USD200 |
| ... | ... | ... | ... | ... | ... | ... | ... |

PRIVACY PROTECTION FOR THIRD PARTY DATA SHARING

FIELD

The application relates generally to communication networks, and more particularly, but not exclusively, to privacy protection for third party data sharing.

BACKGROUND

This section introduces aspects that may be helpful to facilitating a better understanding of the inventions. Accordingly, the statements of this section are to be read in this light and are not to be understood as admissions about what is in the prior art or what is not in the prior art.

It is generally known that communication network operators (e.g., network owners and/or network service providers) typically collect user traffic information as well as service access (e.g., location service) information, and keep the information for a given period of time. This data allows network operators, among other things, to address user complaints about incorrect billing and to correct the user billing as appropriate.

Network operators have also realized that such traffic and service access information can be valuable. For example, network operators have developed and deployed value-added services or VAS (e.g., advertising service, market forecast services, and user behavior analysis services) via data analysis and data mining procedures. Moreover, network operators have realized that they can share the traffic information and service access information with third parties to increase profits. For example, network operators can share the information with industry analyst firms (e.g., IDC and Gartner) to perform deep dive analyses, as well as with advertising providers to allow the advertising providers to personalize advertisements sent to users.

SUMMARY

Illustrative embodiments provide techniques for privacy protection for third party data sharing.

For example, in one embodiment, a method includes the following steps. A set of raw data relating to activity of one or more users in accordance with a communication network is obtained. The communication network is managed by a network operator. The obtained set of raw data is processed in accordance with at least one data isolation policy maintained by the network operator to generate a first set of data comprising at least a portion of the set of raw data with sensitive data associated with the one or more users removed; a second set of data comprising the sensitive data removed from the set of raw data; and a third set of data comprising a mapping between portions of the set of raw data and the first set of data. The first set of data is exposed to a third party, while the second set of data and the third set of data are isolated from the third party.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor configured to perform steps of the above-described method.

Advantageously, illustrative embodiments provide techniques for network operators to share data with third parties without exposing private information of users of the network to the public.

These and other features and advantages of embodiments described herein will become more apparent from the accompanying drawings and the following detailed description.

DETAILED DESCRIPTION

Illustrative embodiments will be described herein with reference to exemplary computing systems, data storage systems, communication networks, processing platforms, systems, user devices, network nodes, network elements, clients, servers, and associated communication protocols. However, it should be understood that embodiments are not limited to use with the particular arrangements described, but are instead more generally applicable to any environment in which it is desirable to provide mechanisms and methodologies for improved security in the form of privacy protection for third party data sharing in a communication network.

One critical issue for network operators is how to share traffic and service access information with third parties while maintaining the privacy of its network users. Illustrative embodiments, as will be explained in detail herein, enable a network operator (e.g., network owner and/or network service provider) to share data with third parties without exposing network users' privacy to the public. In illustrative embodiments, this is accomplished by one or more of removing users' sensitive information before sharing data with third parties and preventing sensitive data from leaving the network environment controlled by the network operator. These and other illustrative embodiments will be explained below using the following service access information example. It is to be understood, however, that one of ordinary skill in the art will realize that alternative embodiments may be implemented on other forms of data in a straightforward manner given the inventive teachings provided herein.

As used herein, the phrase "third party" generally refers to any party other than the network operator and the user. By way of example only, a third party can be an individual, another user, a group, an entity, a business, a system, etc.

Figure 1A:
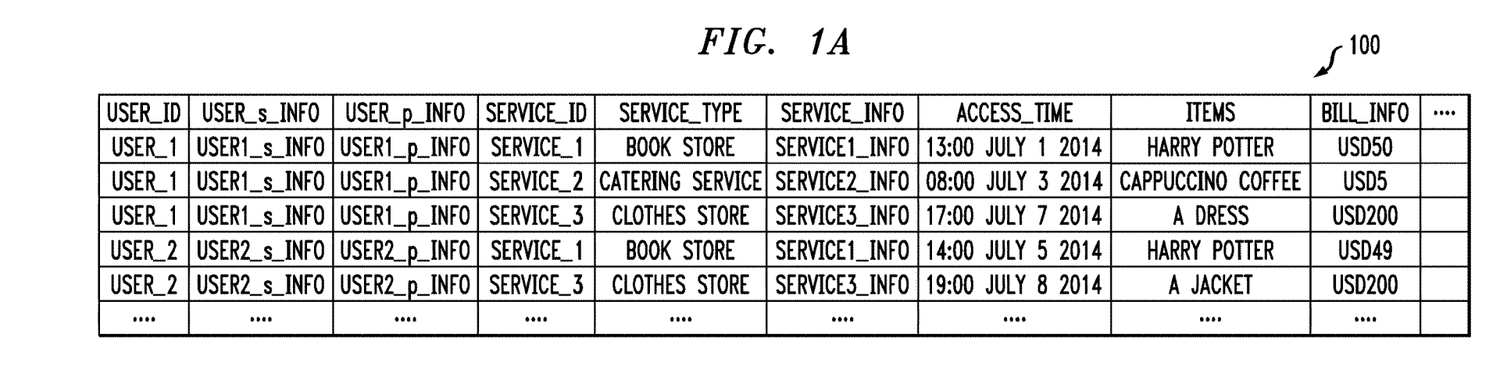
FIG. 1A shows a tabular example of raw data representing service access information according to one embodiment.
Figure 1B:
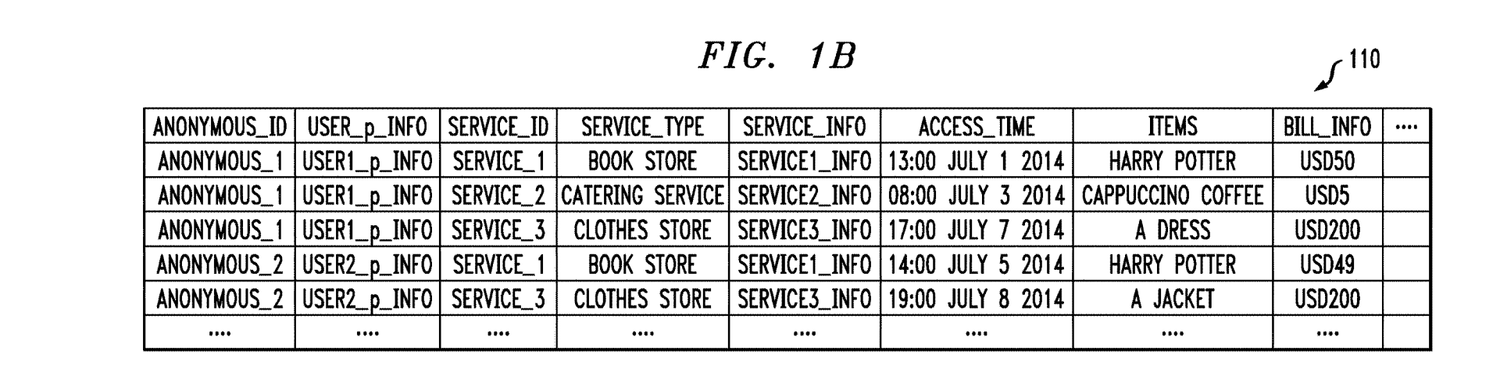
FIG. 1B shows a tabular example of processed data whereby private information of users is removed from the raw data in FIG. 1A.
Figure 1C:
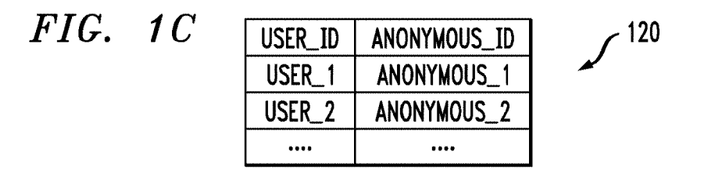
FIG. 1C shows a tabular example of a mapping relationship between identifiers in FIG. 1A and identifiers in FIG. 1B.
Figure 1D:
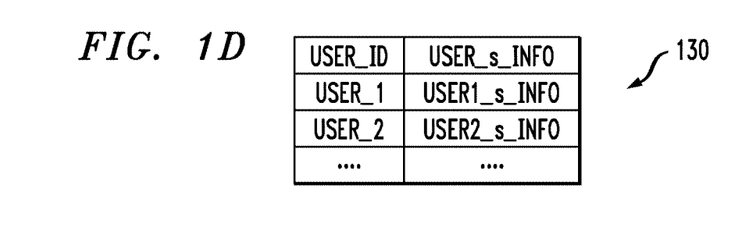
FIG. 1D shows a tabular example of user sensitive data removed from the raw data in FIG. 1A.
Figure 1E:
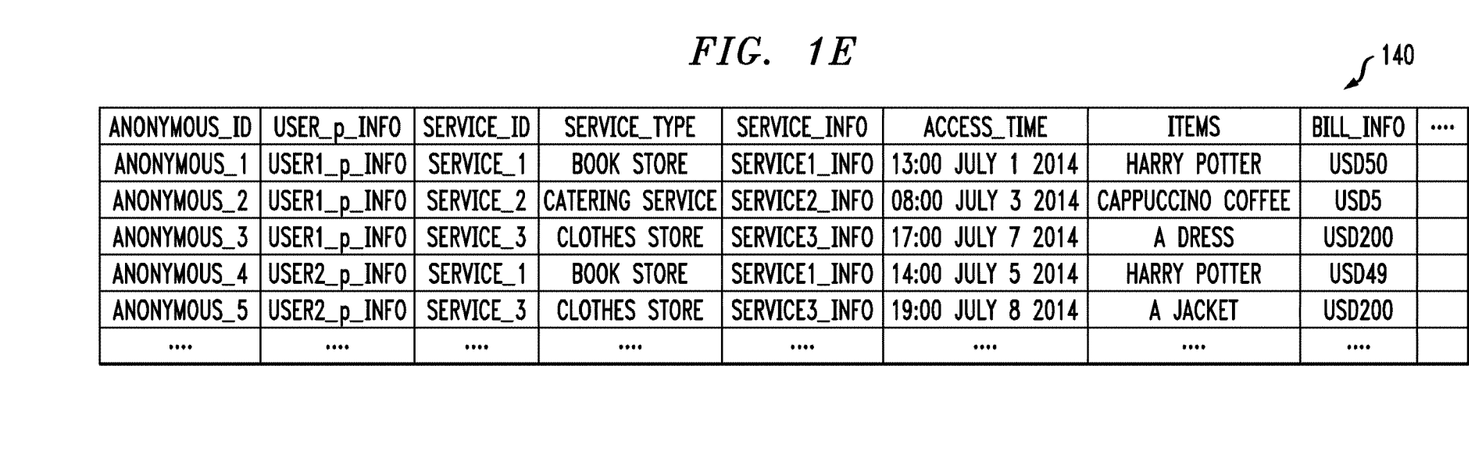
FIG. 1E shows a tabular example of processed data whereby private information of users is removed from the raw data in FIG. 1A according to one embodiment.
Figure 1F:
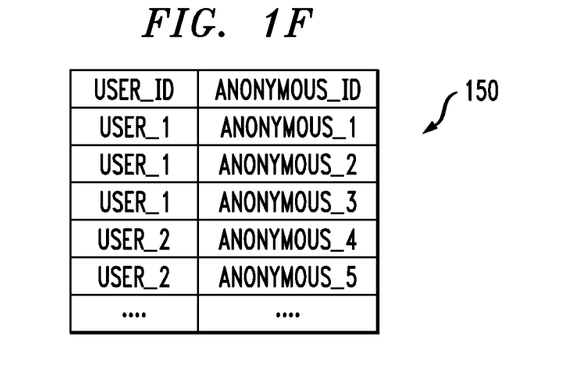
FIG. 1F shows a tabular example of a mapping relationship between identifiers in FIG. 1A and identifiers in FIG. 1E.
Figure 1G:
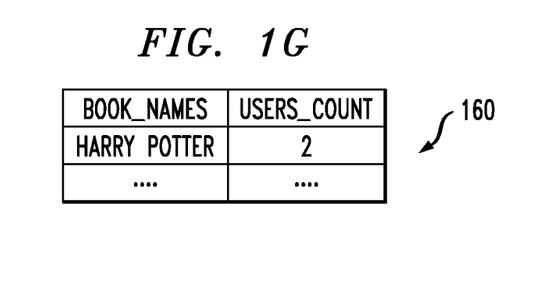
FIG. 1G shows a tabular example of statistical information derived from the raw data in FIG. 1A.
Figure 1H:
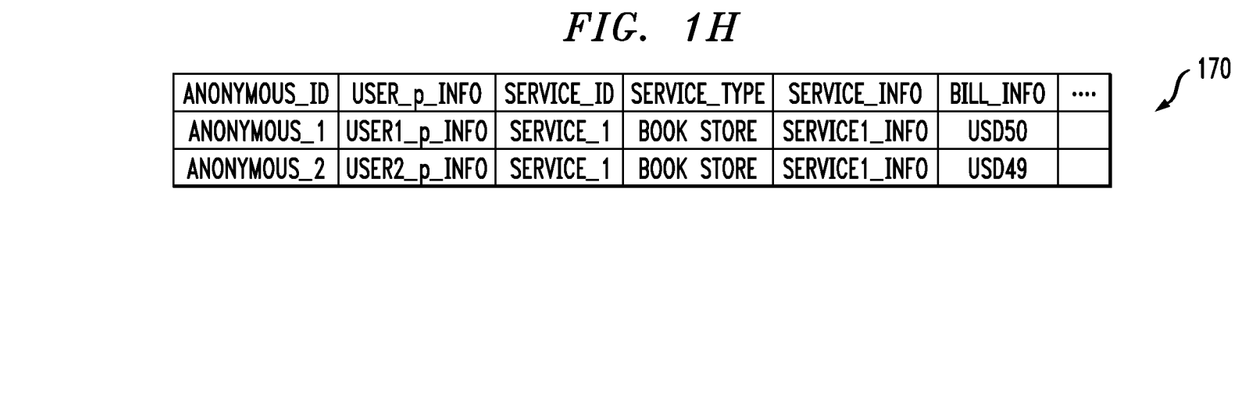
FIG. 1H shows a tabular example of processed data corresponding to the statistical information in FIG. 1G.
Figure 2A:
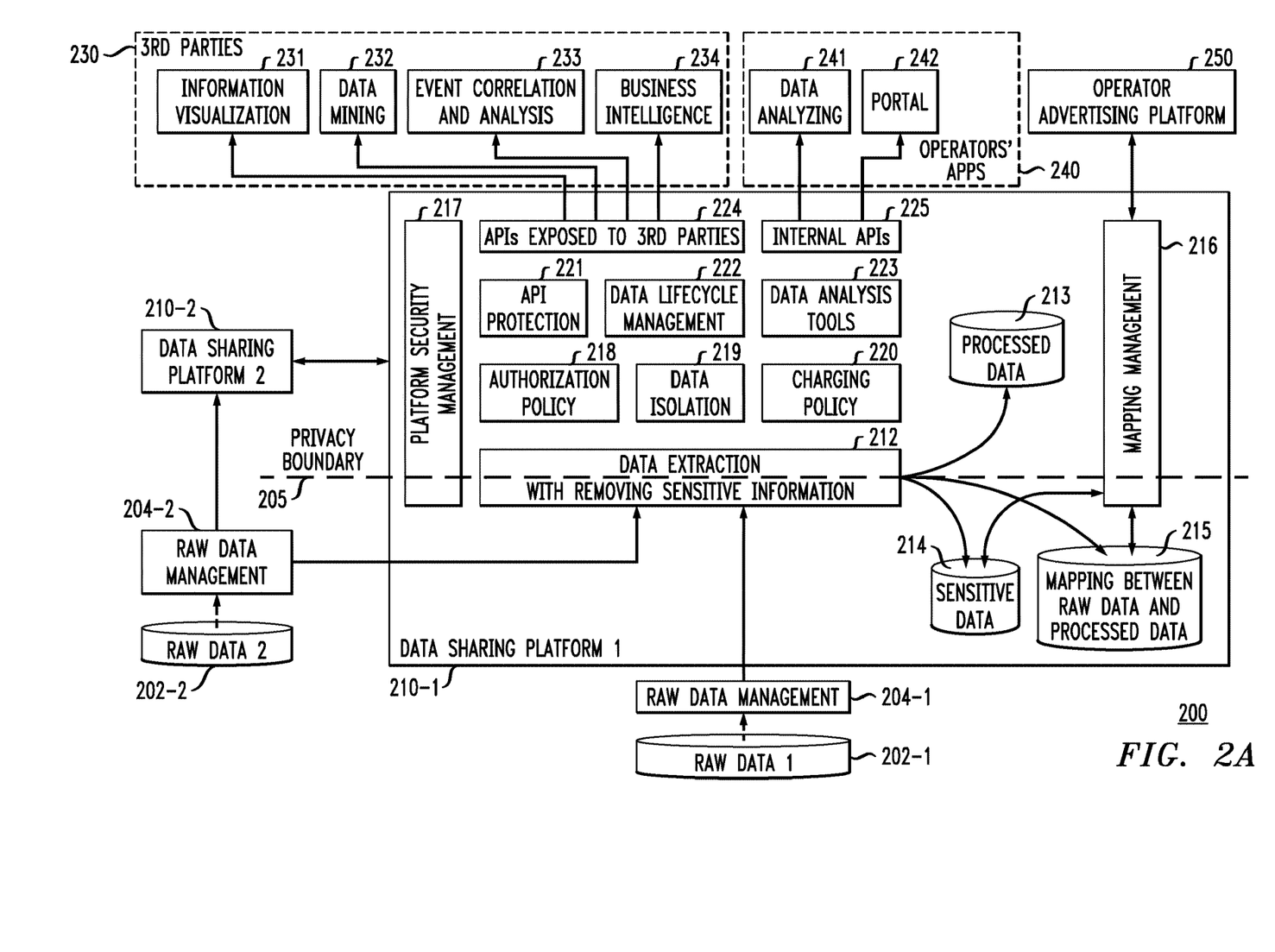
FIG. 2A shows a security architecture environment for third party data sharing according to one embodiment.
Figure 2B:
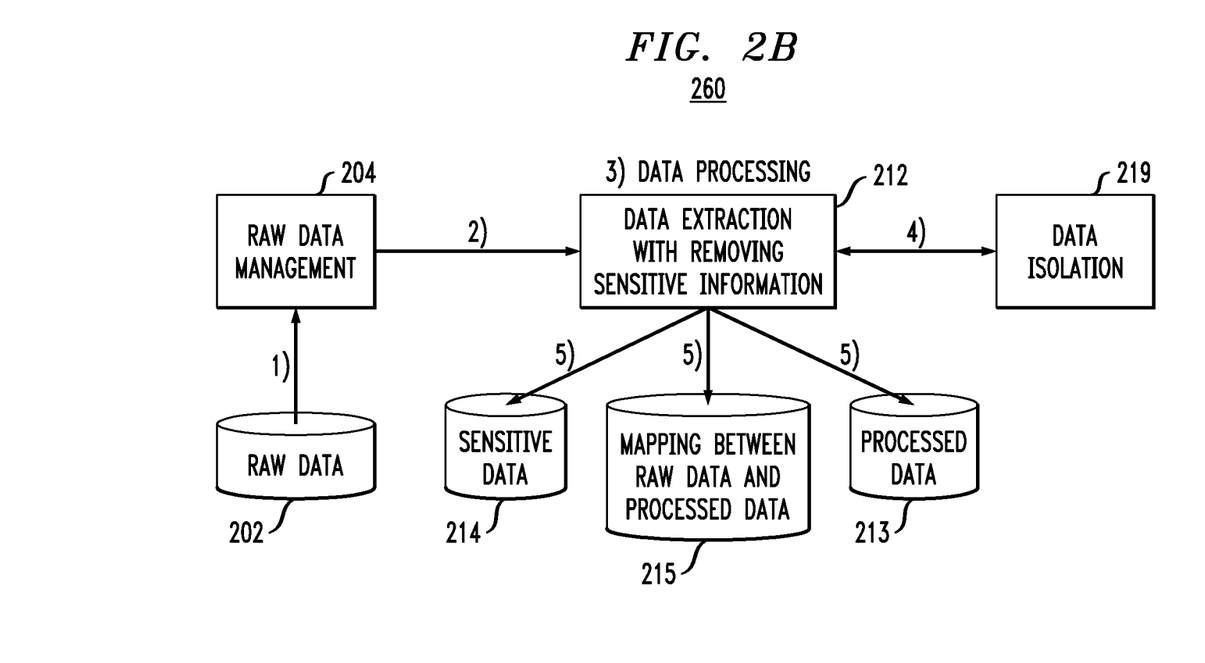
FIG. 2B shows a security methodology for third party data sharing according to one embodiment.
Figure 2C:
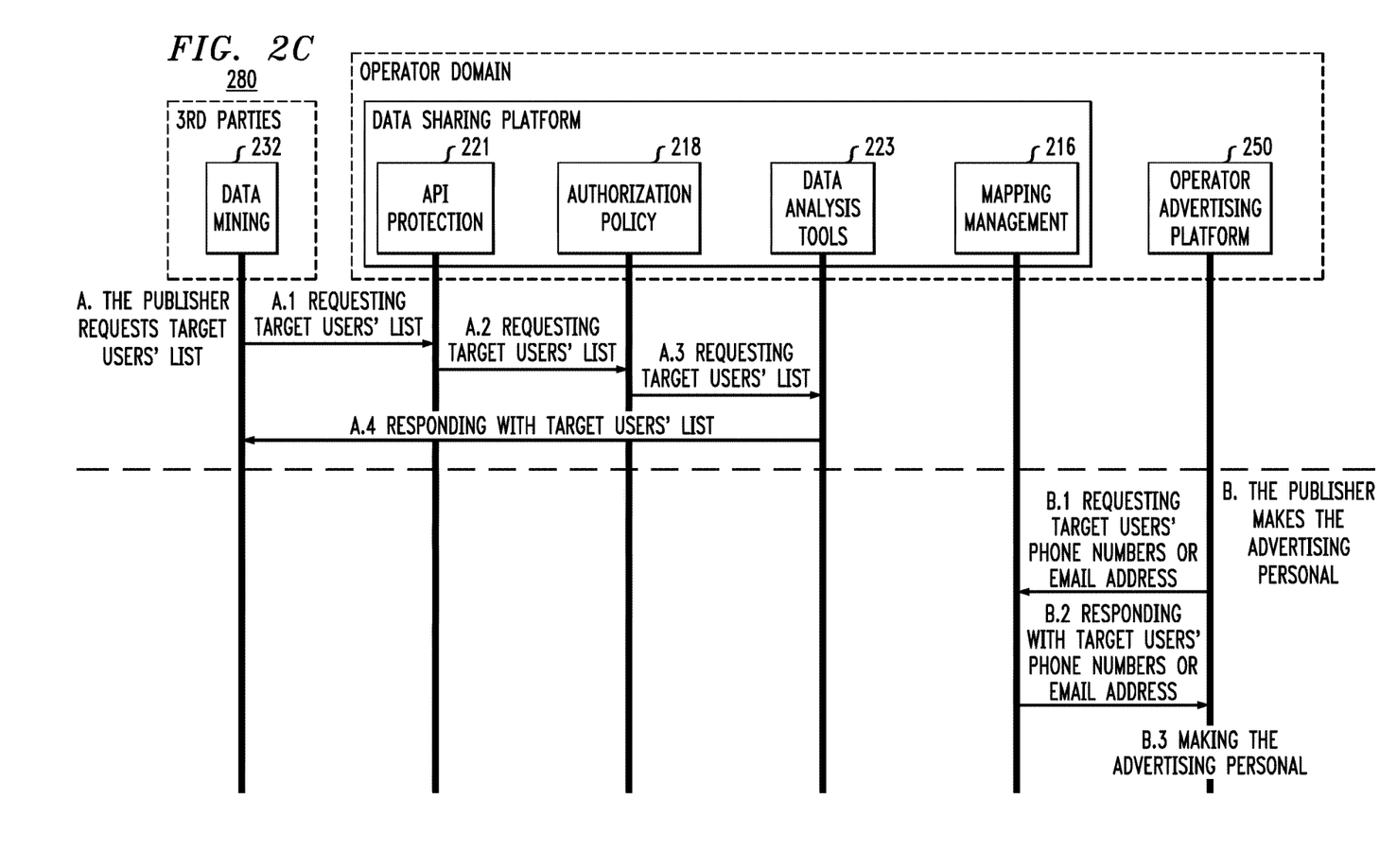
FIG. 2C shows an advertisement personalization methodology for third party data sharing according to one embodiment.

We will first describe privacy protection concepts according to embodiments in the context of FIGS. 1A through 1H, followed by illustrative systems and methodologies for implementing one or more of these concepts in the context of embodiments of FIGS. 2A through 2C.

FIG. 1A shows a tabular example of raw data representing service access information according to one embodiment. It is assumed that this raw data on services access information is collected and kept as records such as depicted in table 100. The raw data in this example relates to goods and/or services purchased through a communication network by network users (e.g., e-commerce website), however, embodiments are not limited to this type of data.

As shown in table 100, the columns of the table contain the following raw data:

User_ID: these are identifiers of the network users' accounts, which are registered in a service platform provided by the network operator.

User_s_Info: this data includes network users' sensitive (private) information that users do not want to share with third parties, by way of example only, email address, location, mobile phone number, residence or business mailing address, etc.

User_p_Info: this data includes network users' public information that users volunteer to share with third parties, by way of example only, career, preference, age, etc.

Service_ID: these are identifiers of the third party service providers' accounts, which are registered in a service platform provided by the network operator.

Service_Type: this data describes types of services, by way of example only, book, clothes, catering service, sports, etc.

Service_Info: this data describes information relating to the third party service providers, by way of example only, email address, phone number, fax number, store mailing address, etc.

Also included in the raw data in table 100 is information relating to the network access time (e.g., when user accessed the network), items purchased, and billing (e.g., purchase prices).

Before sharing the data in table 100 with third parties, it is realized that the raw data should be processed as follows:

(i) users' sensitive information (e.g., User_ID, User_Info) in the raw data of table 100 is removed and stored separately;

(ii) User_ID is replaced with an Anonymous_ID; and (iii) the mapping relationship between User_ID and Anonymous_ID is kept in order for advertising providers to personalize their advertisements.

Thus, the raw data of table 100 is divided into three tables:

table 110 in FIG. 1B shows processed data whereby sensitive information of users is removed from the raw data in FIG. 1A;

table 120 in FIG. 1C shows a mapping relationship between identifiers (User_ID) in FIG. 1A and identifiers (Anonymous_ID) in FIG. 1B; and table 130 in FIG. 1D shows user sensitive data (User_s_info) removed from the raw data in FIG. 1A.

It is realized that the data of table 100 (FIG. 1A), table 120 (FIG. 1C) and table 130 (FIG. 1D) should be kept inside of the network operator domain (i.e., system environment) such that the data is inaccessible to third parties.

The processed data of table 110 (FIG. 1B) could theoretically be shared with third parties for data analysis and data mining. However, a third party that receives the data of table 110, and that is proficient at event correlation and analysis (ECA), can possibly trace the behavior of an anonymous user (e.g., anonymous_1 in table 110) and identify the real user (e.g., user_1 in table 100) by combining this data with some other information. To reduce the possibility of tracing user's behavior, data in table 110 is further processed according to one or more further illustrative embodiments.

In one embodiment, for each given user, correlation information among different services is removed. For example, in table 110, three different Anonymous_IDs are set for the user anonymous_1 who accesses three services service_1, service_2, and service_3. In this way, it is more difficult for a third party to find correlation factors for a given user. Therefore, table 110 and table 120 are be changed to table 140 in FIG. 1E and table 150 in FIG. 1F, respectively.

It is further realized that sometimes third parties need only statistical data for market forecast. For example, a book publisher assumes that those users buying the book *Harry Potter* will be the potential readers for a new book written by J. K. Rowling. So the publisher wants to know how many users bought the book *Harry Potter* so that it can then forecast the numbers of new books to be published. In this scenario, table 160 in FIG. 1G is generated by analyzing data in table 110 in FIG. 1B. Then, this statistical data (with any user sensitive information removed) is sent to the publisher. Table 170 in FIG. 1H will be described below in the context of an advertisement personalization embodiment.

FIG. 2A shows a security architecture environment 200 for third party data sharing according to one embodiment. This illustrative architecture is implemented and managed by a network operator to protect its users' privacy when sharing data with third parties. Moreover, one data sharing platform 210-1 can also share data with other data sharing platforms, e.g., 210-2.

As shown, environment 200 comprises raw_data_1 202-1 and raw data management component 204-1 which are associated with data sharing platform 210-1, while raw_data_2 202-2 and raw data management component 204-2 are associated with data sharing platform 210-2. It is to be understood that data sharing platform 210-2 may have the same or similar components as shown and described below for data sharing platform 210-1.

Data sharing platform 210-1 comprises data extraction component 212, processed data 213, sensitive data 214, mapping data (between raw data and processed data) 215, mapping management component 216, platform security management component 217, authorization policy component 218, data isolation component 219, charging policy component 220, API (application programming interface) protection component 221, data lifecycle management component 222, data analysis tool 223, APIs (exposed to third parties) 224, and APIs (internal to network operator domain) 225. As shown, APIs 224 provide interfaces between the data sharing platform 210-1 and third parties 230 (and their applications) including, for example, information visualization service provider 231, data mining service provider 232, event correlation and analysis service provider 233, and business intelligence service provider 234. APIs 225 provide interfaces between the data sharing platform 210-1 and network operator applications 240 including, for example, data analyzing service 241 and network operator portal 242. Also shown in environment 200, mapping management component 216 is coupled to network operator advertising platform 250. Note that dashed line 205 denotes the privacy boundary.

Data extraction component 212 comprises logic functions configured to process raw data collected by network operators. According to different models, there are several ways to divide the raw data into different tables. For example, according to a coarse-grained model, raw data in table 100 can be split into table 110, table 120, and table 130. According to a finer-grained model, raw data in table 100 can be split into table 130, table 140, and table 150.

The databases shown in FIG. 2A include: processed data database 213 which stores users' public data (e.g., table 110 and table 140) and which can be shared with third parties; sensitive data database 214 which stores users' sensitive information (e.g., table 130) and is not shared with third parties; and mapping data database 215 (e.g., table 120 and table 150) which stores the data reflecting the mapping relationship between raw data and processed data and is not shared with third parties. Mapping management component 216 manages the database mapping relationship between raw data and processed data. For example, in the scenario of an advertising service, real user information can be found by searching sensitive database 214 and the database of mapping relationships 215.

Data isolation component 219 sets and maintains the data isolation policy of the network operator. For example, as explained above, raw data is divided into sensitive data, processed data, and the data reflecting the mapping relationship between raw data and processed data. Third parties can access processed data to perform data analysis and data mining. However, third parties are prohibited from accessing raw data, sensitive data, and the data reflecting the mapping relationships. This prohibited data is isolated and stored separately (e.g., stored in different physical equipment). For processed data, it is possible to isolate certain information. For example, correlation information among different services for the same user is removed from the processed data (resulting in table 150) in order to make it more difficult for third parties to find correlation factors for a given user.

Authorization policy component 218 implements data access policies. In an illustrative data sharing platform, there can be at least two sets of policies for users' data access. One is for the representative who executes the application, the other one is for the application invoking data sharing platform APIs. A combined access control policy comprises access rights intersection between the representative (executing the application) and the application (invoking data sharing platform APIs). For example, the representative who executes the application data mining 232 is a super administrator of the data sharing platform and has full rights (e.g., read, search, write, update, etc.) to access processed data and sensitive data. However, the application data mining 232 is a third party application and, in this example, only has the right to search processed data. Therefore, the final right for the super administrator executing the application data mining 232 is the right to search processed data.

APIs exposed to third parties 224 are APIs for third party applications to access users' data. Internal APIs 225 are APIs for internal platform management and applications to access users' data. API protection component 221 (e.g., referring to IETF OAuth2.0) includes functions such as authentication of an API, authentication of the owner who invokes the API, and confidentiality and integrity for data analysis result transportation, e.g., Transport Layer Security (TLS)/Secure Socket Layer (SSL).

Platform security management component 217 includes functions such as software update, log and audit, anti-virus/malware, trusted computing module, authentication and access control for administrators, etc.

Charging policy component 220 manages charging policies which specify the cost to third parties depending on their data usage (e.g., data type, data size, etc.). Data lifecycle management module 222 manages the lifecycle of the specified data such as data collecting, data processing, data sharing, data storing, data clearing, etc. Data analysis tools 223 include statistics and statistical analysis, correlation analysis, etc.

FIG. 2B shows a security methodology for third party data sharing according to one embodiment. Note that components from security architecture environment 200 in FIG. 2A that are implicated by methodology 260 are numbered in FIG. 2B the same as they are numbered in FIG. 2A for consistency of understanding.

In step 1, the raw data management component 204 is triggered to retrieve raw data (e.g., unprocessed) from the database Raw_Data 202. The triggering mechanisms include but are not limited to a time trigger in the raw data management component 204, a request from data extraction component 212 (also including a time trigger in the data extraction component and requests from other components). In an illustrative embodiment, data transfer between the raw data database 202 and the raw data management component 204 is secure. In illustrative embodiments, Internet Protocol Security (IPsec) or Transport Layer Security (TLS) can be employed to secure the data transportation.

In step 2, the raw data management component 204 forwards the retrieved raw data to the data extraction component 212. TLS or IPsec is used to secure data transfer between component 204 and component 212.

In step 3, the data extraction component 212 processes the raw data according to isolation policies from administrators obtained in step 4 from data isolation component 219. By way of example only, raw data received is the data in table 100. According to the policies, table 100 is processed resulting in tables 130, 140 and 150. The data extraction component 212 sends the three resulting tables to three separate databases in step 5. Table 140 is stored in the processed data database 213. Table 150 is stored in the mapping database 215. Table 130 is stored in the sensitive data database 214. In an illustrative embodiment, data transfer between the data extraction component 212 and the three databases is secure, e.g., using IPsec or TLS to secure the data transportation.

In one use case, a publisher assumes that those users buying the book *Harry Potter* will be the potential readers for a new book written by J. K. Rowling. Thus, the publisher wants to know how many users bought the book *Harry Potter* so that the number of new books to be published can be predicted. Moreover, assume that the publisher wishes to send advertising information about the new book written by J. K. Rowling to those users who bought the book *Harry Potter*.

With the data sharing platform described in FIG. 2A, the publisher can generate a market forecast and personalize advertisements as shown in FIG. 2C. Note that components from security architecture environment 200 in FIG. 2A that are implicated by methodology 280 are numbered in FIG. 2C the same as they are numbered in FIG. 2A for consistency of understanding. According to FIG. 2C, the procedures are described as follows:

A. The publisher invokes the data mining application 232 (note this application performs statistics analysis) to request the target users' list and how many users bought the book *Harry Potter* (tables 160 and 170).

A.1) The data mining application 232 sends the message to the API protection component 221 to request the target users' list. The API protection component 221 authenticates both the publisher (as an end user) and the data mining application 232. Illustrative authentication mechanisms may be based on username/password, symmetric key and/or certificates. According to illustrative use cases, IETF OAuth2.0 may be used as access authorization for third party applications.

A.2) After successful authentication for both the publisher and the data mining application, the API protection component 221 forwards the request to the authorization policy component 218. The authorization policy component 218 checks the access policies for both the publisher and the data mining application, and determines the intersection between the publisher and the data mining component as final access right for this request. For example, assume the publisher can only access data about users' transactions on books sold from Amazon.com (it is assumed the publisher may have to pay more money to access other transactions on books sold from other online bookstores). The data mining application has the right to access data on all users' transactions on books in the processed data database 213. Therefore, the final access right for this request is that only transactions on the book *Harry Potter* sold from Amazon.com will be calculated and provided to the publisher.

A.3) The authorization policy component 218 forwards the message to the data analysis tools 223. The data analysis tools 223 retrieve data from the processed data database 213 according to the access policy that only transactions on the book *Harry Potter* sold from Amazon.com will be calculated and the related list of users will be provided as the target users' list to make the advertising personal.

A.4) The data analysis tool 223 responds to the data mining application 232 with the statistics data (table 160) and the target users' list (table 170). Therefore, the publisher gets the statistics data on how many users bought the book *Harry Potter* as well as the target users' list. With this information, the publisher can personalize the advertising on new book written by J. K. Rowling for the given target users.

IPsec or TLS may be used to secure the data transfer between the data mining application and the data sharing platform.

B. After getting the target users' list, assume the publisher wants to send advertising information about the new book written by J. K. Rowling to those target users. However, the publisher does not know the real contact information (e.g., email address, phone number) of those target users. The publisher thus has to request the network operator to help to make the advertising personal through the operator advertising platform 250.

B.1) The operator advertising platform 250 sends the message to the mapping management component 216 to get users' real contact information.

B.2) The mapping management component 216 retrieves the users' mapping information (as in table 150), and then retrieves the users' real contact information (as in table 130). The mapping management component 216 responds to the operator advertising platform 250 with the corresponding users' real contact information.

B.3) The operator advertising platform 250 then send advertising information about the new book written by J. K. Rowling to those target users for the publisher. The operator advertising platform 250 belongs to the operator's domain and will thus not expose users' sensitive data to third parties (e.g., the publisher). In this way, users' privacy can be protected. IPsec or TLS may be used to secure the data transfer between the operator advertising platform 250 and the data sharing platform.

Figure 3:
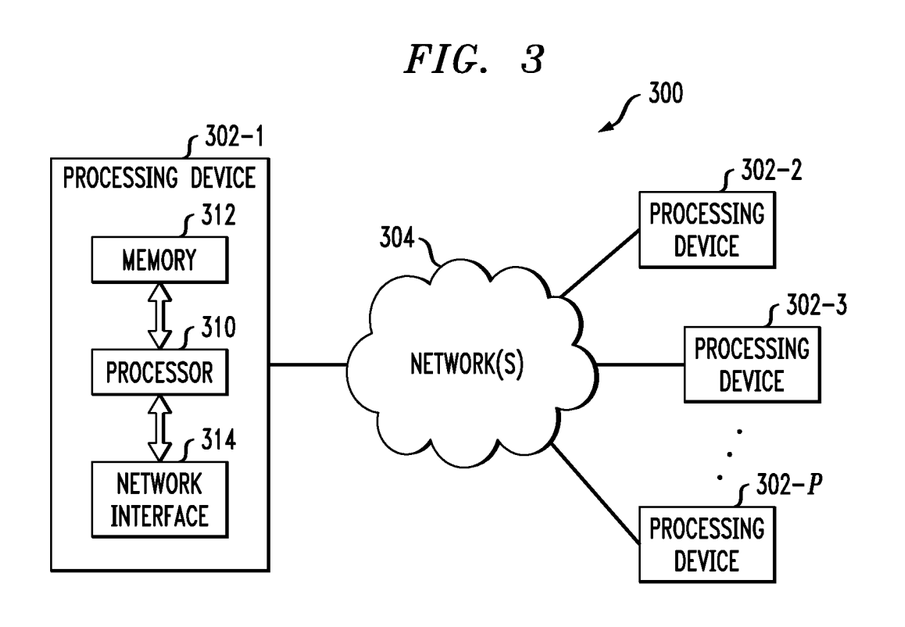
FIG. 3 shows a processing platform on which a security architecture for third party data sharing is implemented according to one or more embodiments.

Turning now to FIG. 3, a processing platform is shown on which a security architecture (e.g., 200 in FIG. 2A) is implemented according to one or more embodiments. The processing platform 300 in this embodiment comprises a plurality of processing devices denoted 302-1, 302-2, 302-3, . . . 302-P, which communicate with one another over a network 304. One or more of the components and/or modules of architecture 200 (e.g., APIs, components, databases, etc.) may therefore each run on one or more computers or other processing platform elements, each of which may be viewed as an example of what is more generally referred to herein as a "processing device." As illustrated in FIG. 3, such a device generally comprises at least one processor and an associated memory, and implements one or more functional modules for instantiating and/or controlling features of systems and methodologies described herein. Multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random access memory (RAM), read-only memory (ROM) or other types of memory, in any combination. The one or more software programs when executed by a processing device such as the processing device 302-1 causes the device to perform functions associated with one or more of the components/steps of system/methodology 300. One skilled in the art would be readily able to implement such software given the teachings provided herein. Other examples of processor-readable storage media embodying embodiments may include, for example, optical or magnetic disks.

Also included in the processing device 302-1 is network interface circuitry 314, which is used to interface the processing device with the network 304 and other system components. Such circuitry may comprise conventional transceivers of a type well known in the art.

The other processing devices 302 of the processing platform 300 are assumed to be configured in a manner similar to that shown for processing device 302-1 in the figure.

The processing platform 300 shown in FIG. 3 may comprise additional known components such as batch processing systems, parallel processing systems, physical machines, virtual machines, virtual switches, storage volumes, logical units, etc. Again, the particular processing platform shown in FIG. 3 is presented by way of example only, and SDN network 100 of FIG. 1 may include additional or alternative processing platforms, as well as numerous distinct processing platforms in any combination.

Also, numerous other arrangements of servers, computers, storage devices or other components are possible. Such components can communicate with other elements of the system over any type of network, such as a wide area network (WAN), a local area network (LAN), a satellite network, a telephone or cable network, a storage network, a converged network or various portions or combinations of these and other types of networks.

Furthermore, it is to be appreciated that the processing platform 300 of FIG. 3 can comprise virtual machines (VMs) implemented using a hypervisor. A hypervisor is an example of what is more generally referred to herein as "virtualization infrastructure." The hypervisor runs on physical infrastructure. Processing platform 300 may also include multiple hypervisors, each running on its own physical infrastructure. As is known, VMs are logical processing elements that may be instantiated on one or more physical processing elements (e.g., servers, computers, processing devices). That is, a VM generally refers to a software implementation of a machine (i.e., a computer) that executes programs like a physical machine. Thus, different VMs can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

Although certain illustrative embodiments are described herein in the context of communication networks utilizing particular communication protocols, other types of networks can be used in other embodiments. As noted above, the term "network" as used herein is therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing load balancing functionality. The particular manner in which network nodes communicate can be varied in other embodiments. Also, it should be understood that the particular assumptions made in the context of describing the illustrative embodiments should not be construed as requirements of the inventions. The inventions can be implemented in other embodiments in which these particular assumptions do not apply. These and numerous other alternative embodiments within the scope of the appended claims will be readily apparent to those skilled in the art.

What is claimed is:

1. An apparatus comprising:
   at least one processor; and
   at least one memory including computer program code;
   the at least one memory and the computer program code configured to, with the
   at least one processor, cause the apparatus at least to perform:
   obtaining a set of raw data at least comprising user traffic and service access information relating to activity of one or more users over a
   communication network, wherein the communication network is managed by a
   communication network operator;
   processing the obtained set of raw data in accordance with at least one data
   isolation policy maintained by the communication network operator to generate a first set of data comprising at least a portion of the set of raw data with sensitive data associated with the one or more users removed;
   a second set of data comprising the sensitive data removed from the set of raw data;
   and a third set of data comprising a mapping between portions of the set of raw data and the first set of data;
   exposing the first set of data to a third party;
   and isolating the second set of data and the third set of data from the third party;
   wherein the raw data further comprises
   identifiers of network users' accounts, which are registered in a service platform provided by the communication network operator, network users' sensitive information that users do not want to share with third parties, network users' public information that users volunteer to share with third parties, identifiers of the third party service providers' accounts, which are registered in a service platform provided by the communication network operator, types of services used, information relating to third party service providers, and information relating to the network access time, items purchased, and billing.

* * * * *